United States Patent
Penelon et al.

[11] Patent Number: 6,110,288
[45] Date of Patent: Aug. 29, 2000

[54] TEMPERATURE PROBE AND MEASUREMENT METHOD FOR LOW PRESSURE PROCESS

[75] Inventors: Joel Penelon, Monrovia; Andre Cardoso, Laurel, both of Md.

[73] Assignee: Eaton Corporation, Cleveland, Ohio

[21] Appl. No.: 09/213,925

[22] Filed: Dec. 17, 1998

[51] Int. Cl.⁷ .................. C23C 16/00; H05H 1/00
[52] U.S. Cl. ............ 118/724; 156/345; 374/208; 165/80.1
[58] Field of Search .............. 156/345; 118/724, 118/725, 723 HC, 723 E; 204/298.09; 165/80.1, 8.02, 8.04, 287, 288, 290; 374/135, 208

[56] References Cited

U.S. PATENT DOCUMENTS

| | | |
|---|---|---|
| 4,457,359 | 7/1984 | Holden . |
| 4,909,314 | 3/1990 | Lamont, Jr. . |
| 4,949,783 | 8/1990 | Lakios et al. . |
| 5,761,023 | 6/1998 | Lue et al. . |
| 5,775,416 | 7/1998 | Heimanson et al. ............ 165/80.1 |
| 5,791,782 | 8/1998 | Wooten et al. ................ 374/208 |

*Primary Examiner*—Shrive Beck
*Assistant Examiner*—P. Hassanzadel
*Attorney, Agent, or Firm*—Pollock, Vande Sande & Amernick, R.L.L.P.

[57] ABSTRACT

A temperature probe for use in low pressure processes having an improved thermal response wherein fluid is supplied to a fluid transport passageway in the probe head for creating an increased pressure between the probe head and a semiconductor wafer for increasing the thermal conductivity therebetween.

24 Claims, 4 Drawing Sheets

TEMPERATURE PROBE AND MEASUREMENT METHOD FOR LOW PRESSURE PROCESS

BACKGROUND OF THE INVENTION

The present invention is directed to an improved temperature probe based on contact technology for low pressure processing of semiconductors, and to an improved method of measuring temperature in such processes.

The manufacture of semiconductor devices such as integrated circuits from semiconductor wafers may involve a number of steps. It may be necessary to carry out some of these steps in a low pressure environment where the pressure may be less than about 10 torr. Since the normal atmospheric pressure in the air at sea level is 760 torr, it can be seen that the processing may take place at only a small fraction of atmospheric pressure.

In the performance of many such processes, it is necessary to monitor the temperature of the semiconductor wafer. This is usually done with the use of a temperature probe which contains a temperature sensor such as a thermocouple, in contact to the wafer. It has been found that when a temperature probe is used in a low pressure process as described above, the reading provided by the temperature sensor does not closely follow the actual temperature of the wafer. This causes a problem because accurate temperature readings are necessary to monitor and control the production process.

The present inventors believe that the problem is caused by the fact that at low pressure, the thermal conductivity of gases in the reaction chamber becomes low. That is, while the wafer and the temperature probe appear to the naked eye to be contacting each other, at a microscopic level, the contact is sporadic rather than continuous, and the space between contact points is at a pressure which is the same as or close to the low pressure at which the process is performed. Since at such low pressure, the thermal conductivity of gases is low, the rate of heat transfer between the wafer and the contact surface of the probe is not good enough for the temperature sensor to rapidly respond to changes in the actual temperature of the wafer.

U.S. Pat. No. 5,791,782, the contents of which are in their entirety incorporated by reference, discloses a temperature probe wherein the probe freely pivots on the support under the weight of the semiconductor wafer so as to maintain close contact therewith. This suitably improves the responsiveness of the temperature sensor in a higher pressure environment. Although one of the objects of the prior patent is to provide temperature measurements which closely follow the actual temperature of the wafer in a vacuum or low pressure environment, the inventors herein have ascertained that the configuration of the prior patent does not accomplish this.

SUMMARY OF THE INVENTION

It is thus an object of the present invention to provide a temperature probe which more rapidly responds to changes in wafer temperature in a low pressure environment.

It is a further object of the invention to provide an improved probe head for a temperature probe.

It is still a further object of the invention to provide an improved method of measuring the temperature of a semiconductor wafer in a low pressure environment.

In accordance with an aspect of the invention, a temperature probe which facilitates more accurate wafer temperature measurement is provided, which is comprised of a probe head having a flat contact surface for contacting a semiconductor wafer, and having a temperature sensor disposed therein, a fluid transport passageway in the probe head communicating from the contact surface to another surface of the probe head, and a support for the probe head.

In the operation of the device, a source of fluid, preferably gas communicates with the fluid transport passageway in the probe head for creating an overpressure or a "cushion of gas" between the probe head and the semiconductor wafer. This increases the thermal conductivity between the probe head and the wafer so that the temperature sensor responds more rapidly to changes in wafer temperature.

In accordance with a further aspect of the invention, a method of improving the thermal responsiveness of a temperature probe is provided which comprises the step of supplying fluid to the region between the temperature probe and the wafer in an amount which is sufficient to increase the pressure between the wafer and the probe to above about 20 torr.

BRIEF DESCRIPTION OF THE DRAWINGS

The invention will be better understood by referring to the accompanying drawings, wherein:

Referring to FIG. 1, a temperature probe in accordance with the prior art, as disclosed in above-mentioned U.S. Pat. No. 5,791,782 is depicted. It is comprised of metallic probe head 1 which sits on support 7. The probe head has contact surface 3 on which the semiconductor wafer rests. The probe head may be arranged to pivot freely on support 7 under the weight of the semiconductor wafer to maintain contact therewith.

A diametrical hole 5 is drilled in the probe head, and a thermocouple is inserted therein, after which the structure may be crimped or collapsed to maintain the thermocouple is good contact with the probe head. Thermocouple wires 6A and 6B are brought out of the hole 5.

Figure 1:
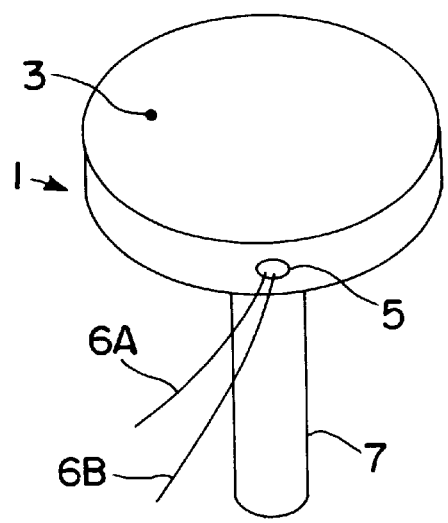
FIG. 1 shows a prior art temperature probe.

As discussed above, it has been found that prior art temperature probes, including the probe shown in FIG. 1, do not function well in a low pressure processing environment such as may be used in plasma stripping, etching, LPCVD (Low Pressure Chemical Vapor Deposition) and other processes performed at low pressure. Even if a freely pivoting probe head is used, microscopic 3-point contact sets the limit for closeness of the contact which can be maintained between the wafer and the probe head. As mentioned above, contact between the wafer and probe head is discontinuous in the low pressure environment.

Figure 5:
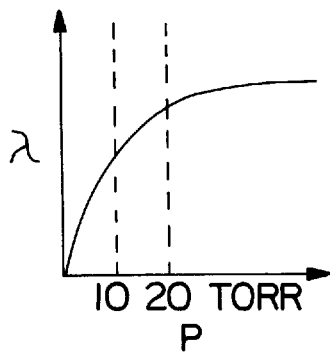
FIG. 5 graphically illustrates heat conductivity of a typical gas vs. pressure.

FIG. 5 is a typical graph of heat conductivity for a gas vs. pressure. As can be seen, the heat conductivity falls precipitously below about 20 torr and becomes so low that it results in a very high value of thermal resistance, responsible for a difference in temperature.

Figure 2:
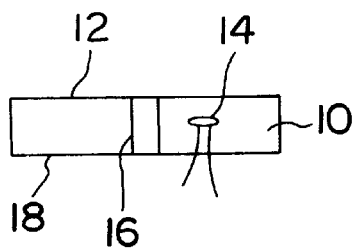
FIG. 2 is a diagrammatic illustration of a probe head in accordance with the present invention.

Referring to FIG. 2, a diagrammatic illustration of a probe head 10 in accordance with the invention is depicted. The probe head is metallic and has a flat contact surface 12. It also has a temperature sensor 14, such as a thermocouple embedded therein, by the method described in connection with FIG. 1 or some other method providing an adequate thermal contact. However, unlike the prior art embodiment of FIG. 1, the probe head of FIG. 2 has fluid transport passageway 16 which communicates between the contact surface 12 and surface 18, which is opposite the contact surface.

In accordance with the invention, passageway 16 is supplied with a gas to create a slight overpressure, exceeding about 20 torr, in the region between the probe surface and the wafer. This raises the heat conductivity in this region enough to substantially eliminate the temperature gradient resulting in a more accurate temperature measurement.

Figure 3:
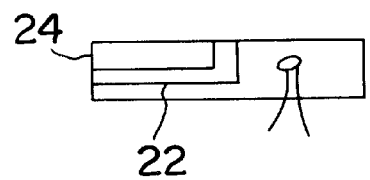
FIG. 3 is a further diagrammatic illustration of a probe head in accordance with the invention.

While in FIG. 2, the fluid transport passageway goes to the surface opposite the contact surface, it may go to and be fed from some other surface of the probe head. This is illustrated in FIG. 3, wherein fluid transport passageway 22 communicates to the side 24 of the probe head. In an actual embodiment the fluid transport passageway may be very narrow and may be no bigger than the opening in a hypodermic needle of gage #26.

Figure 4:
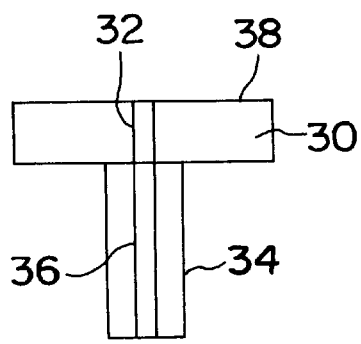
FIG. 4 is a diagrammatic illustration of a temperature probe in accordance with the invention.

Referring to FIG. 4, probe head 30 is depicted having fluid transport passageway 32. The probe head is on support 34 which contains fluid transport passageway 36 which communicates with a source of gas for creating the overpressure above contact surface 38. The term "support" as used herein means any type of member whatsoever having as one of its functions the support of a probe head.

Figure 6:
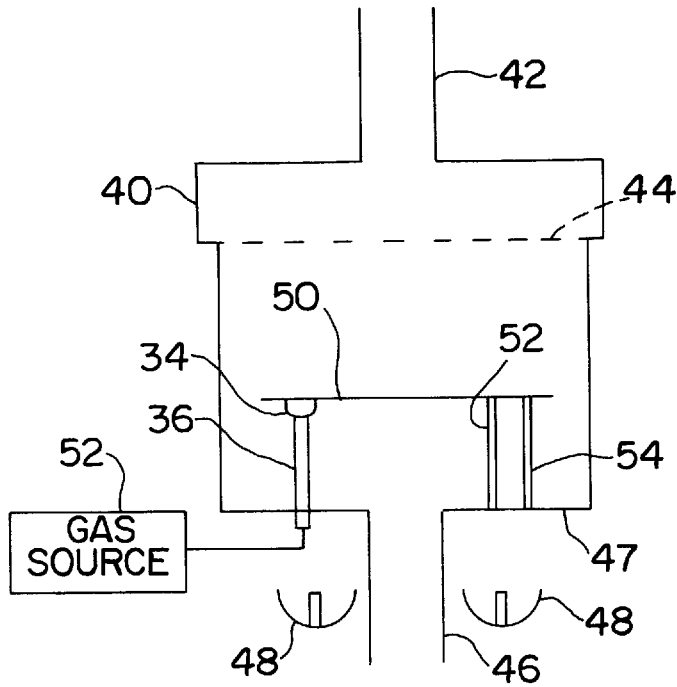
FIG. 6 shows a process chamber incorporating the temperature probe of the invention.

FIG. 6 shows a semiconductor wafer process chamber 40. It includes a processing gas inlet 42, a gas distribution plate 44, and a gas exhaust outlet 46. The gas may for example be oxygen or a mixture of oxygen, fluorinated gases, hydrogen nitrogen in the example of photoresist and residue removal, performed at 1.5 torr typically.

The bottom 47 of the chamber is transparent, and heating lamps 48 are situated below the bottom of the chamber 40 to direct radiant energy at a semiconductor wafer 50 located in the chamber. The wafer 50 is supported above the bottom of the chamber by three supports. Two of the supports 52 and 54 are glass or quartz pegs which extend from the bottom 47, while the third support is the temperature probe of the present invention, as schematically depicted in FIG. 4.

Generally, for such application, the process in the chamber is below 5 torr and the wafer is below 300° C. Heat transfer in these conditions occurs mainly by conduction and radiation.

The temperature of the probe head depends on the thermal contact resistance between the wafer and the probe head and mostly on the thermal resistance between the probe head and all the surroundings. The thermal contact resistance between probe head and wafer is strongly dependent on the thermal conductivity of the gas filing the gap between. This thermal resistance is high when the gap pressure is below 10 torr and low when higher than 20 torr. A low thermal resistance provides a good thermal contact and the probe temperature becomes close to that of the wafer.

The fluid transport passageway in the support for the temperature probe is fed by gas source 52 which is located outside of the process chamber. Gas source 52 may simply be the ambient atmosphere outside of the process chamber, i.e., passageway could simply be vented to the atmosphere. In the alternative, gas source 52 could be a gas having a high heat conductivity such as helium. In either case, the flow is forced by the difference of pressure from outside to inside the chamber. This gas flow fills the gap between the probe and the wafer until the gap pressure equalizes the mechanical pressure the wafer exerts on the probe. The increased pressure between the probe and wafer follows from the weight of the wafer applied over the probe surface. However, the flow of gas should be low enough not to affect the process.

Figure 7:
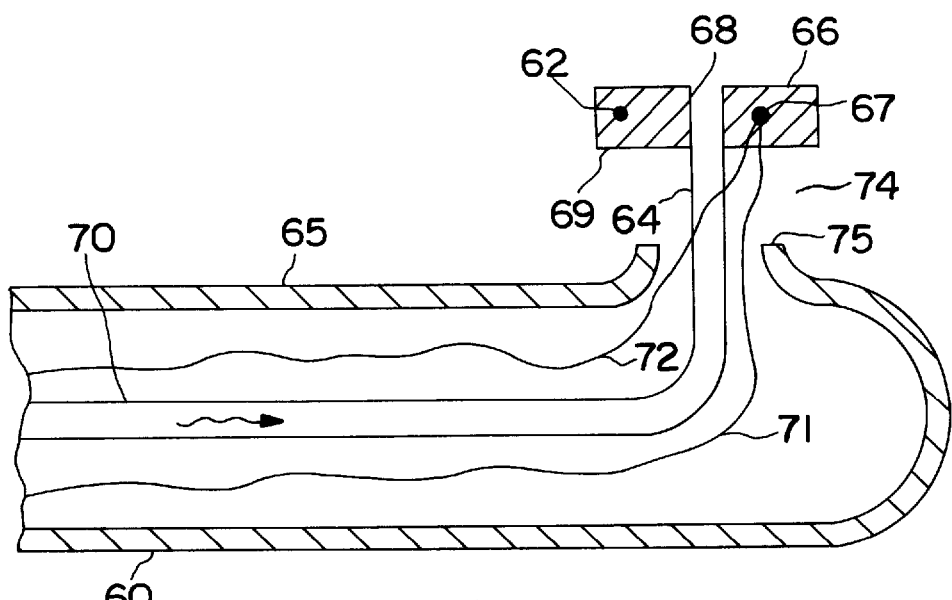
FIG. 7 shows a sectional view of a temperature probe in accordance with an embodiment of the invention.

Referring to FIG. 7, a specific embodiment of a temperature probe 60 in accordance with the invention is shown. The probe is comprised of probe head 62 and support 64/65. The probe head has flat contact surface 66, and thermocouple 67 embedded therein, and the probe head also has fluid transport passageway 68 which extends from the contact surface 66 to surface 69, which is opposite the contact surface.

The support is comprised of rigid hollow inner tube 64, which may be made of stainless steel. The interior of this tube comprises the fluid transport passageway in the support and also in at least part of the probe head, as the tube may be inserted into the opening in the probe head part or all of the way. Thus, it is the other end 70 of the inner tube 64 which is connectable with the source of gas which is outside the process chamber.

The thermocouple 67 has lead wires 71 and 72, which exit the probe head, and are fed to monitoring equipment outside the process chamber through outer tube 65, which may be made of quartz, providing a degree of thermal and electrical insulation. Thus, the lead wires are substantially protected from the process gas, which could otherwise degrade them, and the quartz tube provides a degree of thermal insulation for the wires, so as not to cause erroneous temperature readings.

In the design of a temperature probe, it is desirable for the thermal resistance between the semiconductor wafer and the probe head to be substantially less than the thermal resistance between the probe head and the support. In the embodiment shown in FIG. 7, this is accomplished in part by providing space 74 between the probe head, the support and surroundings and the outer tube 65. The design of any practical probe may involve tradeoffs, and variations of the probe shown in FIG. 7 could be made without departing from the spirit and scope of the invention, e.g., the probe head could be arranged to contact and pivot on the lip 75 of the outer tube 65.

Figure 8:
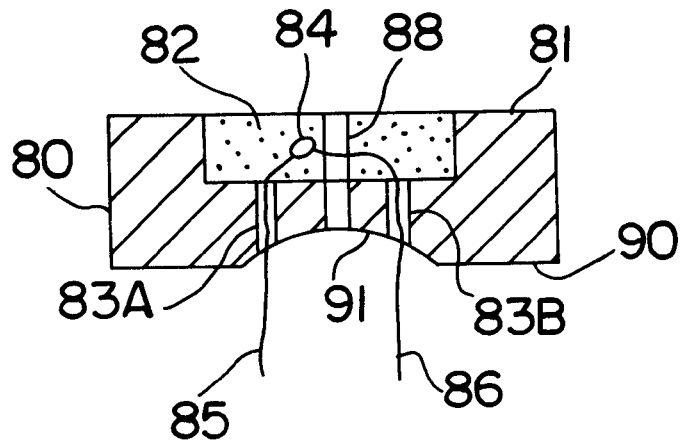
FIG. 8 shows a sectional view of a probe head in accordance with a further embodiment of the invention.
Figure 9:
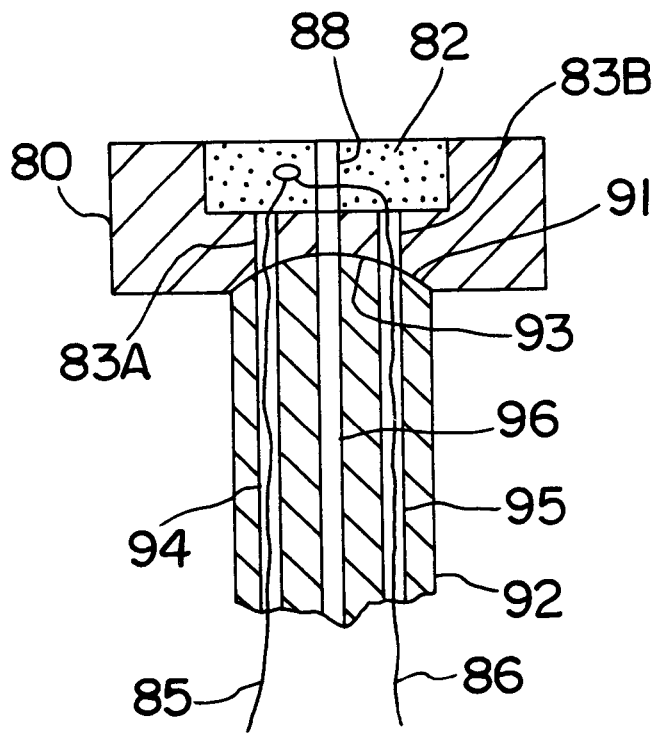
FIG. 9 shows a sectional view of a temperature probe in accordance with an embodiment of the invention which utilizes the probe head of FIG. 7.

A further embodiment of a temperature probe in accordance with the invention is shown in FIGS. 8 and 9. Referring to FIG. 8, a metallic probe head 80 is shown having a ceramic or cement insert 82. The insert 82 is placed in probe head 80 by well known micro-machining techniques. Before the inset is placed in the probe head, thermocouple 84 is embedded therein. The insert 82 may be formed in a mold, and the thermocouple may be embedded before the ceramic or cement is dry.

Probe head 80 has channels 83a and 84b, through which the lead wires 85 and 86 of the thermocouple 84 are run.

Probe head 80 also has gas transport passageway 88, which communicate from the contact surface 81 to an opposing surface 90. Surface 90 has a cavity 91 therein, which may be in the form of a spherical seat.

Referring to FIG. 9, the probe head support/combination is shown. Support 92 has end 93 which is shaped to mate with cavity 91 so that the probe head can freely pivot on the support under the weight of the semiconductor wafer. Support 92 has gas transport channel 96 and thermocouple lead wire channels 94 and 95. Gas from outside the process chamber is fed through gas transport channel 96 to raise the pressure between the probe head and the wafer.

Figure 10:
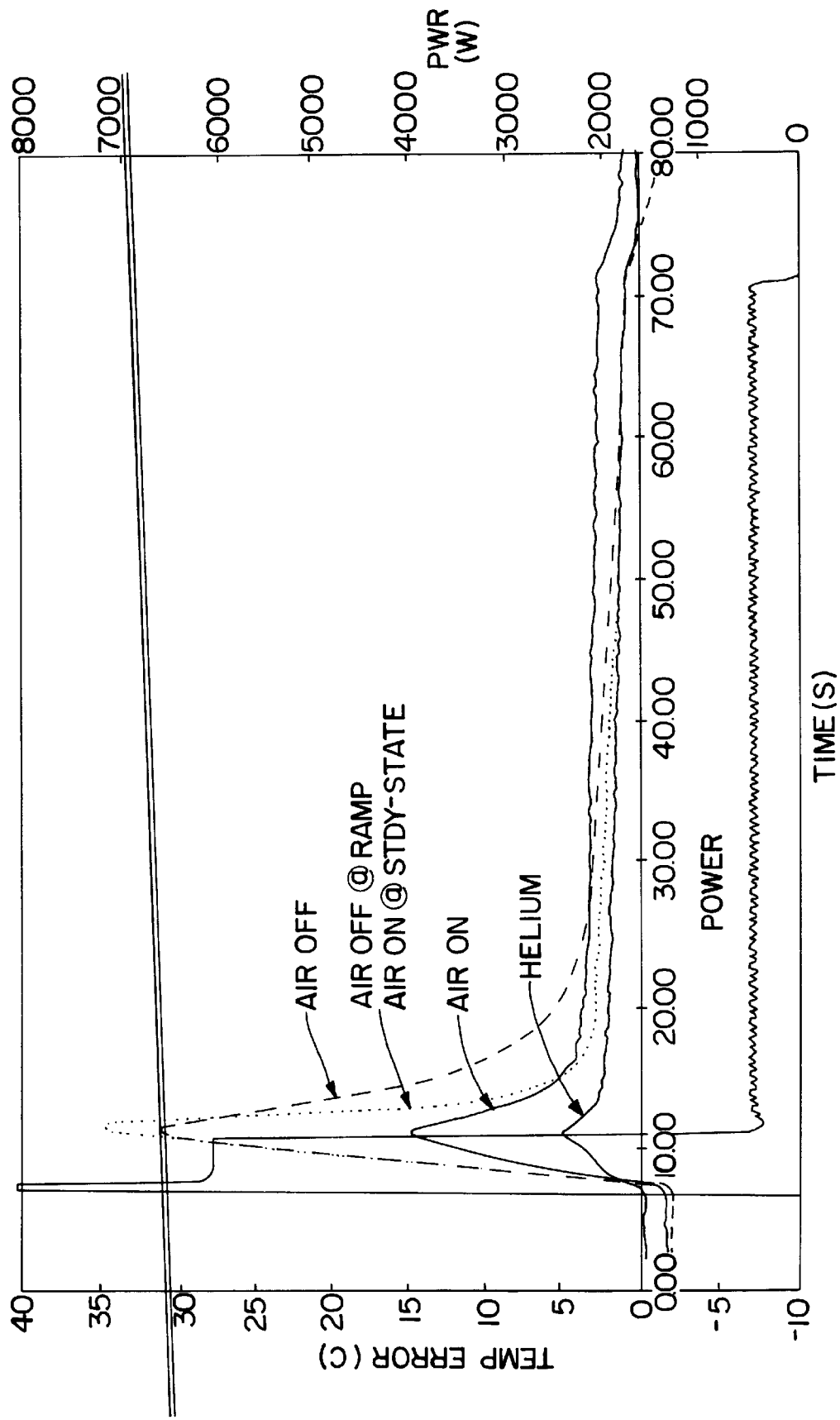
FIG. 10 is a graph of temperature error vs. time, and illustrates the improved results obtained by the invention.

FIG. 10 graphically illustrates the improved results obtained by the present invention. A temperature probe similar to that shown in FIG. 7 was used, while the process being performed on the semiconductor wafer utilized a gas of nitrogen at a pressure of 1 torr. With the use of the invention a gas cushion exceeding 20 torr was created above the probe head.

To understand FIG. 10, it should be appreciated that there is a ramp phase when maximum power is applied to the heating lamps, during which power to the heating lamps is turned on, during which the wafer temperature climbs rapidly, and a steady state phase where the lamps operate at a low power and consequently the wafer temperature are more or less constant.

In FIG. 10, the dashed curve depicts the use of prior art temperature probe, i.e., the air is "off". As can be seen, during the transient created by the ramp phase, there is about a 35° C. temperature difference between the actual and measured temperature. On the other hand, when the temperature probe of the invention is used, i.e., when the air is "on", as depicted by the upper solid line, this temperature difference falls to about 15° C. With the use of helium, which has a higher temperature conductivity than air, as depicted by the lower solid line, the difference falls to about 5° C.

The situation where the air is "off" during the ramp phase and "on" during the steady state phase is shown by the dotted line. A high comparative error is seen during the ramp phase, but a much lower comparative error exists during the steady state phase.

It is thus seen that an advantageous method and devices have been disclosed for greatly improving temperature measurement in low pressure processes. It should be understood that while the invention is depicted herein in accordance with preferred and illustrative embodiments, variations will occur to those skilled in the art, and the scope of the invention is therefore to be defined by the claims which are appended hereto.

What is claimed is:

1. An apparatus for performing a process on a semiconductor wafer, comprising:

a process chamber, means for supplying a gaseous environment to the chamber which is at an ambient process pressure, a temperature probe for supporting along with other support means a semiconductor wafer to be processed, the probe comprised of a probe head and a probe head support, the probe head having a wafer contacting surface in the shape of a flat disk, which over its entire surface contacts only a small area of the wafer, the wafer contacting surface having an orifice, the orifice in the wafer contacting surface of the probe head communicating with a fluid passageway which is connectable to means outside the process chamber for supplying gas to the orifice for raising the pressure above the wafer contacting surface in the region of the small area of the wafer which is contacted to above the ambient process pressure, wherein the wafer is not secured to the wafer contacting surface.

2. The apparatus of claim 1 wherein the probe is comprised of a probe head which includes the wafer contacting surface, and a support, wherein the support is a tubular means having a long dimension and a cross sectional dimension, wherein the cross sectional dimension is small in relation to the long dimension.

3. The apparatus of claim 1 wherein said other support means comprises a plurality of pegs.

4. The apparatus of claim 1 wherein the ambient process pressure is below about 10 torr.

5. The apparatus of claim 4 wherein the means for supplying gas raises the pressure above the probe contact surface to above about 20 torr.

6. The apparatus of claim 1 wherein the means for supplying gas raises the pressure above the probe contact surface to above about 20 torr.

7. A temperature probe for measuring the temperature of a semiconductor wafer and for supporting the semiconductor wafer along with other separate support means, comprising, a probe head having a temperature sensor disposed therein, the probe head having a contact surface in the shape of a disk which over its entire surface contacts only a small area of the semiconductor wafer, there being an opening in the contact surface, a fluid transport passage way in the probe head communicating from the opening and connectable to a fluid source for providing fluid at the opening for forming a fluid cushion beneath the semiconductor wafer, and a probe head support for the probe head.

8. The temperature probe of claim 7 which does not include any means for securing the semiconductor wafer to the probe head.

9. The temperature probe of claim 8 wherein the support comprises a tubular means having a long dimension and a cross-sectional dimension, wherein the cross-sectional dimension is small in relation to the long dimension.

10. The probe of claim 9 wherein the fluid transport passageway in the probe head communicates from the contact surface to a surface of the probe head which is opposite the contact surface.

11. The probe of claim 10 comprising in the support at least one second fluid transport passageway, which at a first end is in fluid communication with the fluid transport passageway in the probe head.

12. The probe of claim 11 wherein at least part of the fluid transport passageway in the probe head, and at least part of the fluid transport passageway in the support, are different portions of a continuous channel.

13. The probe of claim 12 wherein at least part of the support for the probe head comprises a rigid tube, the interior of which comprises said continuous channel.

14. The probe of claim 13 wherein the rigid tube is surrounded at least in part by a second tube, and wherein the temperature sensor has at least one lead wire which runs through the second tube.

15. The probe of claim 14 wherein the second tube does not contact the probe head.

16. The probe of claim 13 wherein part of said tubes are oriented substantially perpendicular to the probe head and part of the tubes are oriented substantially parallel to the probe head.

17. The probe of claim 16 wherein the rigid tube is made of metal while the second tube which surrounds the rigid tube is made of quartz.

18. The probe of claim 11 wherein said at least one fluid transport passageway in the support comprises two fluid transport passageways, and wherein the temperature sensor has two lead wires, which run, respectively, in the two fluid transport passageways.

19. The probe of claim 18 wherein the probe head has two channels through which run, respectively, the two lead wires of the temperature sensor.

20. The probe of claim 19 wherein the two channels in the probe head are in line with the two fluid transport passageways in the support.

21. The probe of claim 19 wherein said surface of the probe head which is opposite the contact surface has a cavity therein, and wherein the support has a shaped end which mates with the cavity so that the probe head may freely pivot on the support.

22. The probe of claims 11 wherein when a semiconductor wafer is situated on the contact surface of the probe head, the thermal resistance between the wafer and the probe head is substantially less than the thermal resistance between the probe head and the support.

23. The apparatus of claim 8 wherein the wafer is heated by radiant energy.

24. The apparatus of claim 7 wherein said other separate support means comprises a plurality of pegs.

* * * * *